United States Patent [19]
Barish

[11] 3,894,183

[45] July 8, 1975

[54] STYLUS ACTUATED ELECTRICAL DEVICES

[76] Inventor: Benjamin J. Barish, 29 Benzalel St., Tel Aviv, Israel

[22] Filed: July 22, 1974

[21] Appl. No.: 490,682

Related U.S. Application Data

[63] Continuation of Ser. No. 265,985, June 26, 1972, abandoned.

[30] Foreign Application Priority Data

June 30, 1971 Israel .................................... 37197

[52] U.S. Cl. ...................... 178/18; 35/66; 200/86 R

[51] Int. Cl. .............................................. G08b 5/22

[58] Field of Search .............. 178/18, 19, 20; 35/61, 35/66; 200/159 B, 61.19, 16 D, 86 R, 61.59, DIG. 5, DIG. 21; 340/146.35 Y; 346/139 C

[56] References Cited

UNITED STATES PATENTS

| | | | |
|---|---|---|---|
| 3,128,458 | 4/1964 | Romero | 178/18 |
| 3,279,100 | 10/1966 | Isnott | 35/66 |
| 3,304,612 | 2/1967 | Proctor et al. | 178/18 |
| 3,405,460 | 10/1968 | Michaelson | 35/66 |
| 3,624,619 | 11/1971 | Ambrosio | 178/18 |
| 3,632,874 | 1/1972 | Malavard et al. | 178/18 |
| 3,798,370 | 3/1974 | Hurst | 178/18 |

*Primary Examiner*—Thomas A. Robinson

[57] ABSTRACT

A stylus-actuated electrical switch comprises a printed circuit board and a flexible sheet carrying an electrical conductor placeable on top of the printed circuit board, with the conductive elements of the latter facing the conductive elements of the flexible sheet, the board and/or the flexible sheet including a coating of soft, pressure-flowable, tacky insulating material, such as wax, normally insulating the conductive elements from each other. When a stylus is applied to the flexible sheet, the insulating material parts, causing the conductive elements to make contact, the tacky nature of the material holding the elements in contact until separated. Also described is a graphic input device for controlling a display panel or recording elements in accordance with the message written by the stylus. Further described is a flexible conductive-carrying sheet useful in such devices.

11 Claims, 10 Drawing Figures

STYLUS ACTUATED ELECTRICAL DEVICES

This is a continuation of application Ser. No. 265,985, filed June 26, 1972, now abandoned.

BACKGROUND OF THE INVENTION

The present invention relates to electrical devices actuatable by the pressure of a stylus. More particularly it relates to a stylus-actuated electrical switching device, to a flexible sheet which is useful in such switching device, and to a graphic input device and display system utilising such switching device.

The present invention makes use of the "Magic-Slate" effect, as described for example in my prior U.S. Pat. Nos. 3,149,425 and 3,139,059.

The "Magic-Slate," or self-erasing slate, has been known for many years and has found wide application in toys and other amusement devices. Briefly, one form includes a coloured backing sheet and an overlying impression sheet. The impression sheet is sufficiently opaque or translucent so that it normally hides or masks the colour of the backing sheet. However, when one writes on the impression sheet, as by a stylus, the impression sheet adheres to the backing sheet along the lines traced by the stylus, and becomes substantially transparent along such lines of adherence. The colour of the backing sheet is thus viewable through the transparent lines of adherence, thereby producing a "write." To erase the write, all that is necessary is to separate the impression sheet from the coloured backing sheet, as by manually lifting the impression sheet or moving a separating slide between them.

In a common form of "Magic-Slate," the coloured backing sheet includes a coating of wax and colouring matter. The wax provides a soft, tacky, pressure-flowable layer which parts under the pressure of the stylus promotes the adherence of the impression sheet along the writing lines, thereby transparentising the impression sheet and rendering the black colour "write" visible. This effect may also be produced by materials other than waxes, for example certain plastics (e.g. soft polyisobutylene, polvinyl acetate and polyethylene), having the foregoing characteristics.

BRIEF SUMMARY OF THE INVENTION

The present invention exploits the foregoing "Magic-Slate" effect to provide novel electrical switching devices and other devices related thereto. This is done by making the backing sheet in the form of a supporting member, such as a printed circuit board, carrying one or more electrically conductive elements; and by having the flexible impression sheet support other electrically conductive elements placeable on top of the supporting member with the conductive elements of both facing each other. The coating of wax, or other equivalent material, is applied either on the conductive elements of the supporting member, and/or on the conductive elements of the flexible sheet, to insulate the two from each other. The wax parts under the pressure of the stylus, thereby bringing the conductive elements of the flexible sheet into contact with conductive elements of the supporting member, wherever the stylus is applied to the flexible sheet.

Further features and several applications of the invention will be described below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
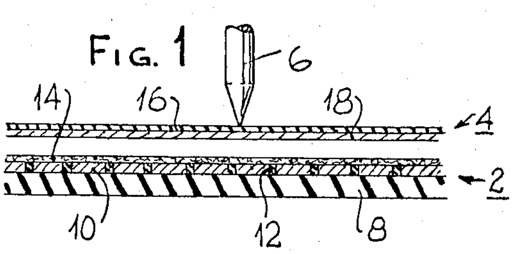
FIG. 1 is a sectional view of one form of stylus-actuated switching device constructed in accordance with the invention.

The basic switching device illustrated in FIG. 1 comprises a supporting member 2 and a flexible sheet member 4 placeable on top of supporting member 2 and adapted to complete an electrical circuit when the pressure of a stylus 6 is applied thereto. Supporting member 2 is a printed circuit board comprising an insulating base 8 carrying on its upper face a layer including a plurality of conductive elements or strips 10 mutually insulated from each other by spaces or lines of insulation 12. A wax coating 14 is applied on top of and between the conductive elements 10. Flexible sheet 4 comprises a plastic backing 16 carrying on one face a conductive layer 18, which may be produced by merely metallizing the plastic sheet 16, e.g. with copper or aluminium.

Supporting member 2 corresponds to the backing sheet of the conventional "Magic-Slate" except that the conductive layer including the mutually insulated conductive elements 10 is provided in lieu of the coloured layer; and the flexible sheet 4 corresponds to the flexible impression sheet of the conventional "Magic-Slate" except that it includes conductive layer 18.

Figure 2:
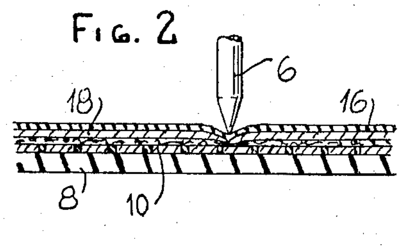
FIG. 2 is a view similar to that of FIG. 1 illustrating how the switch is actuated by a stylus.

As shown in FIG. 2, wherever stylus 6 is pressed against the plastic layer 16 face of flexible sheet 4, the sheet is pressed against the supporting member 2. The wax coating 14, being soft and pressure-flowable, parts under the pressure of the stylus, whereby conductor 18 makes contact with the surface of supporting member 2 and the conductive elements 10 underlying the wax coating. Since the wax coating 14 is also tacky, it holds the conductive layer 18 in contact with member 2 and the conductive elements 10 on removing the pressure of the stylus, as in the conventional "Magic-Slate." In order to interrupt this contact, the flexible sheet 4 is separated from the supporting member 2, as by lifting the flexible sheet manually, or by moving a separating slide between them.

Wax is a preferred example of the material for coating 14, since it is inexpensive, commonly available, and generally used for the conventional "Magic-Slate."

However, it is contemplated that there could be used other insulating materials which are soft, pressure-flowable, and tacky, for example soft polyisobutylene, polyvinyl acetate or polyethylene resins, or mixtures of such resins with wax. The tackiness characteristic of this coating applies a memory property to the device, and it is contemplated that if such memory is not desired, a non-tacky coating material could be used, for example a silicone.

Figure 3:
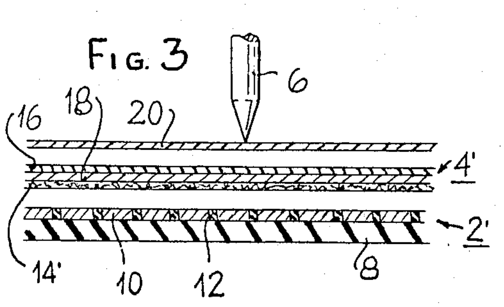
FIG. 3 is a sectional view illustrating another form of switching device in accordance with the invention.

FIG. 3 illustrates a variation wherein the wax coating 14' is applied to the flexible sheet member 4', rather than to the supporting member 2'. This arrangement has the advantage that when the wax coating requires replacement, this may easily be done by merely replacing the complete flexible sheet 4'. The latter sheet may therefore be supplied as a separate article for use with the switching device.

FIG. 3 also illustrates the variation wherein a protective plastic sheet 20 is applied over the flexible sheet 4' (or 4 in FIG. 1) to protect the latter from wear by the stylus.

Figure 4:
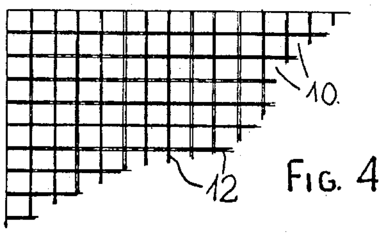
FIG. 4 is a fragmentary view of a matrix-type printed circuit board used in the switching device of FIGS. 1–3.

The novel switching device described above may be used in a number of applications. One such application is as a graphic input device for producing and transmitting to a terminal unit, electrical signals corresponding to the path traced by stylus 6. In such application, the conductive elements 10 of the printed circuit board 2 could be formed as a rectangular matrix, as shown in FIG. 4, with each conductive element separated from the others by insulation 12. Thus, the path of movement of stylus 6 will be converted to electrical signals by the bringing of conductive layer 18 into contact with the conductive elements 10 of the matrix in the path of movement of the stylus. The terminal unit for receiving such electrical signals may be a computer, recorder, print-out, display device, or the like.

Figure 5:
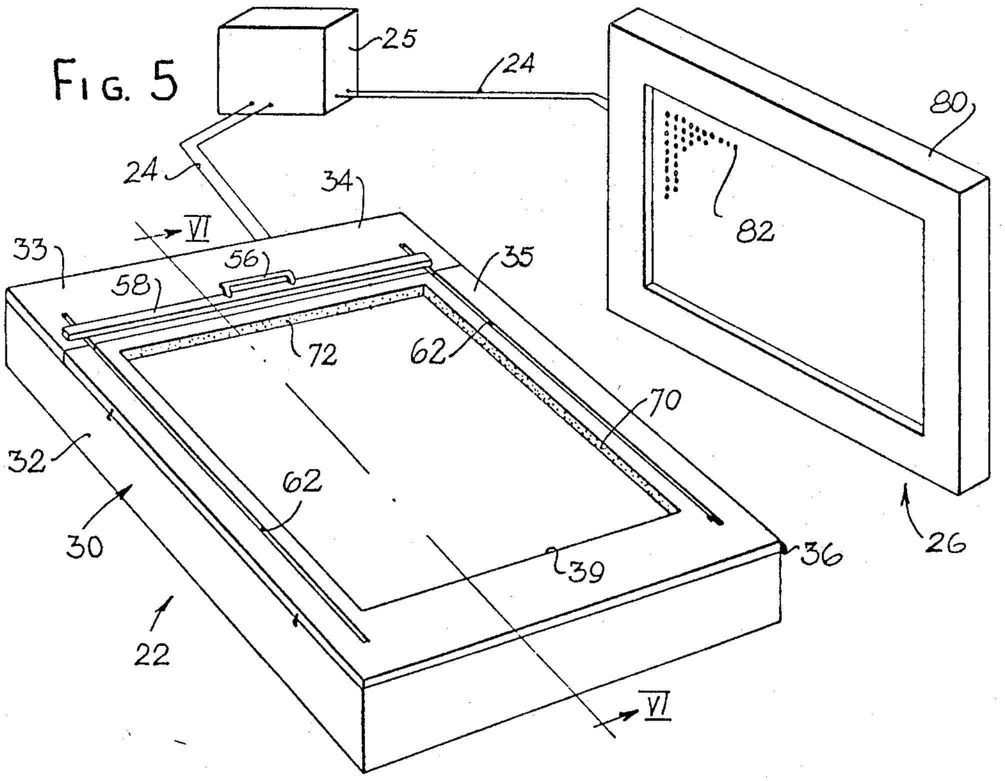
FIG. 5 is a perspective view of a display system including a graphic input device and display panel constructed in accordance with the invention.
Figure 6:
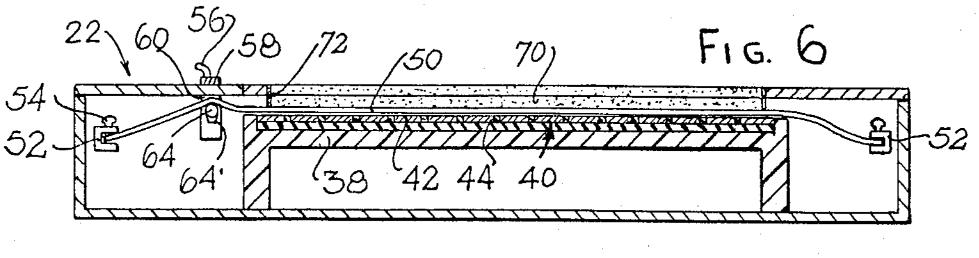
FIG. 6 is a longitudinal sectional view along lines VI—VI of the graphic input device in the system of FIG. 5.
Figure 7:
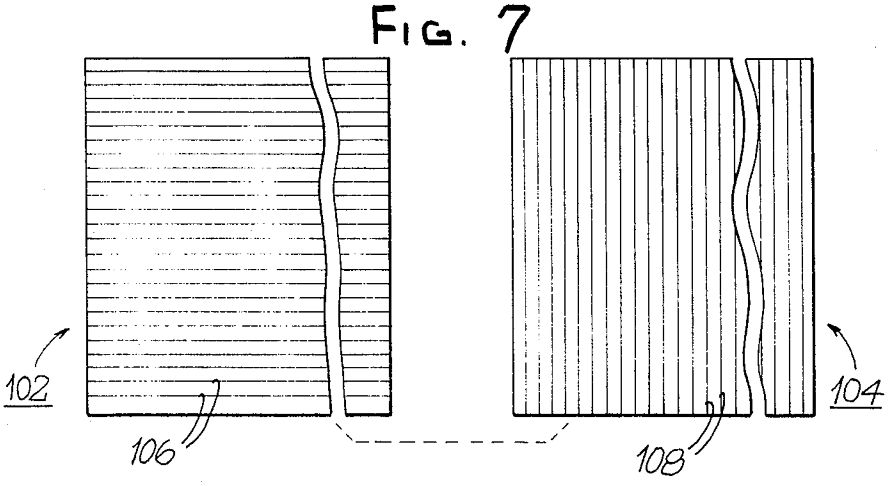
FIG. 7 illustrates another form of electrical switch for a graphic input device constructed in accordance with the invention.
Figure 8:
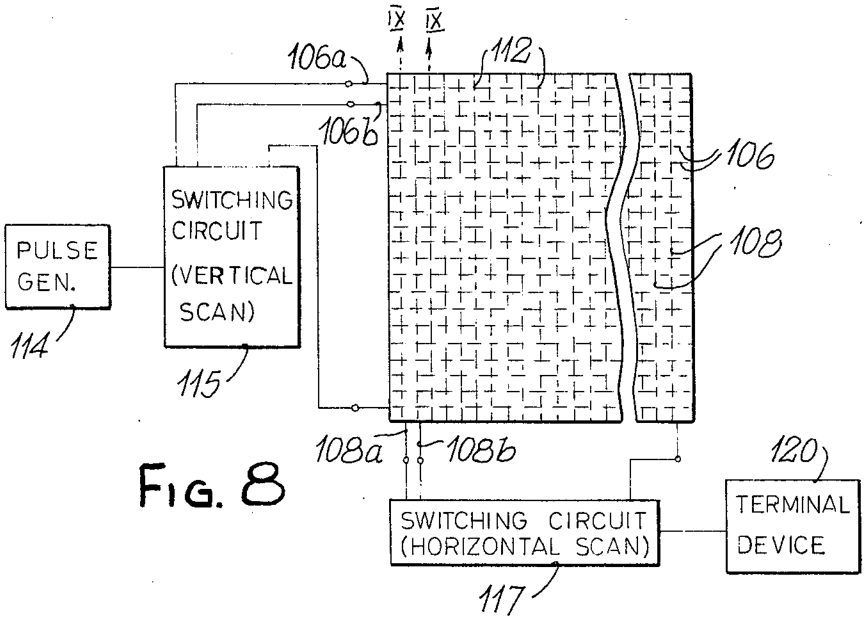
FIG. 8 illustrates a system using the graphic input device of FIG. 7.

FIGS. 5 and 6 illustrate an application of the graphic input device in a display system, for displaying at one location the information manually written at another location. This system includes a graphic input unit 22 at one location connected by cables 24 and control unit 25 to a display unit 26 at a remote location. The information written in unit 22 is reproduced at the remote location by the display unit 26.

Unit 22 comprises a housing 30 similar to that of my U.S. Pat. No. 3,149,425, including a lower section 32 and an upper cover 33. The cover is made of two parts 34 and 35 both hinged at 36 to normally overlie the lower section 32, but each movable to an open position to provide access into the lower section 32. A table 38 is disposed within housing 30, and the upper cover part 35 is formed with an open window 39 in alignment with table 38.

Table 38 is adapted to support the printed circuit board 40 including the rectangular matrix of conductive elements 42 mutually insulated by insulation 44. The flexible sheet 50 (preferably made in accordance with FIG. 3) is placed on top of the printed circuit board 40, and its ends are held between a pair of clamps 52. One (or both) of the latter clamps makes electrical contact with the conductive layer 18 of the flexible sheet and serves as a terminal 54 for an electrical conductor. Printed circuit board 40 also includes electrical terminals (not shown) connected to the conductive elements 42.

For separating the flexible sheet 50 from the printed circuit board 40 in order to interrupt (or "erase") the electrical contacts between the conductive elements in the sheet and printed circuit board, the holder includes a manipulatable device in the form of a hand-grip 56 carried by a bar 58 extending transversely of the holder. At the ends of bar 58 are a pair of depending posts 60 which pass through a pair of slots 62 in cover 35. There is one slot 62 on each side of window 39 and both extend for the complete length, and slightly past both ends, of the window. An elongated separating element in the form of a rod 64 is fixed between posts 60 and engages the underside of flexible sheet 50. Thus, moving hand-grip 56 from one end of window 39 to the opposite end causes rod 64 to separate the complete flexible sheet 50 from the printed circuit board 40. Separating rod 64 carries a wiper element 64' (e.g. of cloth or rubber) which wipes the conductive elements 42 of the printed circuit board during each operation of hand-grip 56 to clean same of any wax deposits.

Strips of cushioning material 70, 72, such as felt or sponge rubber, may be applied to the underside of the upper cover 33 bordering the sides of window 39. These strips perform the functions of sealing the window 39, pressing the flexible sheet 50 against the printed circuit board 40, and slightly loading the slide 58 when the latter is moved to erase the write.

The panel display unit 26 includes a holder 80 carrying a plurality of light-producing elements 82 arranged in a rectangular matrix corresponding to the matrix of conductive elements 42 on printed circuit board 40. The light-producing elements 82 may be any of the known types, for example light bulbs, gas discharge electrodes, light-emitting diodes, plasma, or liquid-crystal elements.

Control unit 25 may include any suitable electrical system, for example, time sharing or multiplex addressing, for controlling the display unit 26 in accordance with the information recorded in unit 22.

In use, a message is written on unit 22, for example by placing a sheet of paper within window 39 on top of flexible sheet 50, and writing the message thereon. Alternatively, a conventional "Magic-Slate" may be provided on top of flexible sheet 50 for writing the message. In either case, the path traced by the stylus or pen for writing the message will make electrical contact between the conductive layer (18, FIG. 3) and the printed circuit conductive elements 42 of the printed circuit board 40, according to the message written. The conductive elements 42 which are contacted by the conductive layer in the flexible sheet will energise their respective light-producing elements 82 of the display unit, and thus the message written on unit 22 will be transmitted to the display unit 80 and reproduced thereon by the energisation of the appropriate light-producing elements 82.

After the transmission of a message has been completed, the information may be erased by merely moving hand-grip 56 and bar 58 across window 39, which causes separating rod 64 to separate the flexible sheet 50 from the printed circuit board 40. The unit is then ready for a new message.

FIGS. 7–10 illustrate further variations which provide advantages of: (1) simplifying the electrical connections to the graphic input device; (2) simplifying the transmission of the information to the terminal device; (3) more positively assuring electrical contact between the conductors of the supporting member (e.g. 2 of FIG. 1) and the flexible sheet (e.g. 4 of FIG. 1); and (4)

enabling the user to see what he writes as he writes with the stylus.

Figure 9:
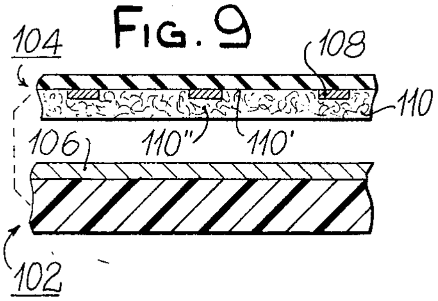
FIGS. 9 and 10 illustrate two variations in the construction of the device of FIG. 7.

In these variations the conductors 106 of the supporting member 102 are disposed in spaced parallel lines as are the conductors 108 of the overlying flexible sheet 104. In the embodiment of FIG. 9, the insulating wax coating 110 (comparable to wax coating 14 of FIG. 1) is applied to flexible sheet 104. The coating fills the spaces 110' between conductors 108, and also forms a layer 110'' covering the exposed faces of conductors 108.

In use, the flexible sheet 104 is placed on top of the supporting member 102 with the conductors 106, 108 at right angles to each other. The intersecting points 112 (FIG. 8) of the two groups of conductors are separated by the wax layer 110''. When a message is written by the stylus, the conductors 108 are brought into contact with the conductors 106 at the intersections points 112 along the line traced by the stylus, the wax layer 110'' being parted at these intersection points by the pressure of the stylus.

To read-out the information written into the unit, the latter is scanned in both coordinates to sense the intersection points 112 at which conductors 108 and 106 are in contact. This may be done, for example, by providing a pulse generator 114 feeding a switching circuit 115 which applies a pulse sequentially to the terminal 106*a* of the first conductor 106, then to the terminal 106*b* of the second conductor 106, and so on through all the conductors 106, thus effecting a vertical scan of the unit. Another switching circuit 117 effects a horizontal scan by sequentially connecting the terminals 108*a*, 108*b*, etc., of conductors 108 to the output or terminal device 120 during the time each conductor 106 carries the pulse from the pulse generator 114. Thus, each conductor 106 is hoorizontally scanned throughout its length, and at every intersection point 112 that it is in contact with a conductor 108, the pulse generator 114 is transmitted as an output signal to the terminal device 120. The latter would include a similar horizontal and vertical scanning arrangement to reproduce this information.

Conductors 106 and 108 may be produced by printed circuit techniques. The terminals 106*a*, 106*b*, etc. may be similarly formed on supporting member 102, preferably on alternating ends of the member. Terminals 108*a*, 108*b*, etc., may be carried by the hinged cover 33 (when the holder of FIGS. 6 and 5 is used), the cover further including contacts (not shown) engaging bare extensions of the conductors 108 when the cover is closed.

The foregoing arrangement thus simplifies the connections to the graphic input device, and also simplifies the transmission of the information to the terminal device. Further, it tends to produce a better contact between the conductors 106, 108 at their intersection points 112 traced by the stylus, since the wax portion 110' between the conductors 108 will also part under the pressure of the stylus and thus hold conductors 108 in contact with conductors 106. If desired, wax may also be applied to the space between conductors 106 of the supporting member 102 and over these conductors to further increase the adherence of the overlying flexible sheet 104 to the supporting member 102 along the line traced by the stylus.

Figure 10:
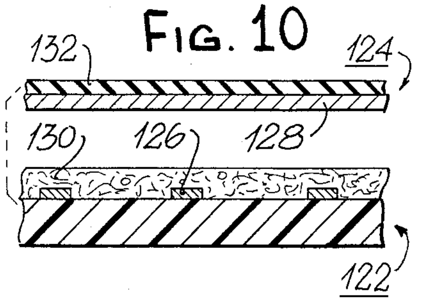

FIG. 10 illustrates a further variation in which the wax coating 130 is applied to the supporting member 122, over and between the spaced parallel conductors 126. Wax coating 130 is coloured (e.g. black), or in the alternative it may be made transparent with an underlying coloured coating applied to the upper surfaces of supporting member 122 and conductors 126. The flexible film or sheet 132, carrying the spaced, parallel conductors 128, is made of the same milky or translucent material as in a conventional magic-slate. Thus, when the user writes on the outer (i.e. the upper, in FIG. 10) surface of the flexible sheet 132, not only will the conductors 128 be pressed into contact with the conductors 126 at their intersection points along the line traced by the stylus, as described above, but also the portions of sheet 132 between conductors 128 will become embedded in the wax layer 130. Thus the portions of sheet 132 between conductors 128 will be transparentised along the line traced by the stylus as in a conventional magic-slate. The user may therefore see the message, or enough to be able to recognise it, as he actually writes it out. The conductors 128 may also be made transparent for this purpose.

Many other variations and applications of the illustrated embodiments (e.g. graphic digitiser, erasible "scratch-pad" memory) will be apparent.

What is claimed is:

1. An electrical switching device comprising a supporting member carrying at least one electrically conductive element, and a flexible sheet member carrying at least one electrically conductive element placeable on top of the supporting member with the two conductive elements facing each other, at least one of said members including a coating of insulating material to insulate the conductive elements from each other when the flexible sheet member is placed on top of the supporting member, said insulating coating being of a soft, pressure-flowable material which parts under the pressure of a stylus upon the application thereof to the flexible sheet member to thereby bring the two conductive elements into contact with each other, said insulating coating also being tacky to hold the two conductive elements in contact with each other upon removing the pressure of the stylus, the flexible sheet member being separable from the supporting member to interrupt said contact.

2. A device according to claim 1, wherein said insulating coating comprises wax.

3. A device according to claim 2, wherein said wax coating is carried by the supporting member on the face thereof carrying its conductive element and over same.

4. A device according to claim 2, wherein said wax coating is carried by the flexible sheet member on the face thereof carrying its conductive element and over same.

5. A device according to claim 1, wherein said supporting member is a printed circuit board carrying a plurality of mutually insulated conductive elements.

6. A device according to claim 5, wherein said electrically conductive element carried by the flexible sheet member is in the form of a thin conductive layer covering the sheet member.

7. A device according to claim 5, wherein said plurality of mutually insulated conductive elements carried by the printed circuit board is in the form of spaced, parallel conductive strips extending in one direction, and wherein said conductive element carried by the flexible sheet member includes another plurality of spaced, parallel conductive strips adapted to extend at right angles to said conductive strips of the printed circuit board when the flexible sheet is placed thereon.

8. A flexible sheet for use in an electrical switching device comprising a thin insulating layer, at least one thin electrically conductive element thereover, and a continuous insulating coating of substantially uniform thickness covering said conductive element, said insulating coating being of a soft, pressure-flowable material which parts under the pressure of a stylus applied to the opposite face of the flexible sheet to bring said conductive element into electrical contact with another conductive element when the flexible sheet is placed thereon, said insulating coating also being tacky to hold the conductive element of the flexible sheet in contact with the other conductive element when the pressure of the stylus is removed, and being easily separable therefrom to interrupt said electrical contact.

9. A flexible sheet according to claim 8, wherein said insulating coating includes wax.

10. An electrical switching device comprising a printed circuit board member carrying a plurality of mutually insulated electrically conductive elements, and a flexible sheet member carrying at least one electrically conductive element placeable on top of the printed circuit board member with the conductive elements of both members facing each other, at least one of said members including a coating of a wax insulating material to insulate the conductive elements of the two members from each other when the flexible sheet member is placed on top of the printed circuit board member, said wax insulating coating being soft and pressure-flowable so as to part under the pressure of a stylus applied to the flexible sheet member and thereby to bring the conductive elements of the two members into contact with each other.

11. A device according to claim 10, wherein said plurality of mutually-insulated conductive elements carried by the printed circuit board are in the form of spaced, parallel conductive strips extending in one direction, and wherein said conductive element carried by the flexible sheet member includes another plurality of spaced, parallel conductive strips adapted to extend at right angles to said conductive strips of the printed circuit board when the flexible sheet is placed thereon.

* * * * *